(12) United States Patent
Potyrailo et al.

(10) Patent No.: US 6,323,303 B1
(45) Date of Patent: Nov. 27, 2001

(54) MELT POLYCARBONATE CATALYST SYSTEMS

(75) Inventors: Radislav Alexandrovich Potyrailo, Niskayuna; John Patrick Lemmon, Delanson; James Claude Carnahan, Niskayuna; Patrick Joseph McClosky, Watervliet, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,228

(22) Filed: Mar. 1, 2001

(51) Int. Cl.$^7$ .................................................. C08G 64/00
(52) U.S. Cl. ......................... 528/196; 528/198; 528/199
(58) Field of Search ................... 528/196, 198, 528/199, 271, 272

(56) References Cited

U.S. PATENT DOCUMENTS

| | | | |
|---|---|---|---|
| 4,251,425 | 2/1981 | Ohara et al. | 528/196 |
| 4,695,286 | 9/1987 | Vanier et al. | 8/471 |
| 4,812,141 | 3/1989 | Baumgartner et al. | 8/506 |
| 5,028,660 | 7/1991 | Kobashi et al. | 525/148 |
| 5,191,038 | 3/1993 | Krabbenhoft et al. | 525/462 |
| 5,319,066 | 6/1994 | King, Jr. | 528/199 |
| 5,344,908 | 9/1994 | Rosenquist | 528/29 |
| 5,373,083 | 12/1994 | King, Jr. et al. | 528/199 |
| 5,412,061 | 5/1995 | King, Jr. et al. | 528/198 |
| 5,461,121 | 10/1995 | Rosenquist | 525/462 |
| 5,674,622 | 10/1997 | Burns et al. | 428/412 |
| 5,816,238 | 10/1998 | Burns et al. | 126/569 |
| 5,871,675 | 2/1999 | Müller et al. | 264/496 |
| 5,973,103 | 10/1999 | Silva et al. | 528/196 |
| 5,981,145 | 11/1999 | Ding et al. | 430/271.1 |

OTHER PUBLICATIONS

Handbook of Polycarbonate Science and Technology, *Ch. 2, Synthesis of Polycarbonates*; Joseph A. King, Jr.; Marcel Dekker, Inc.; ©2000; pp. 7–26.

Diffusion of Gold and Silver in Bisphenol A Polycarbonate; Ralf Willecke and Franz Faupel; *Macromolecules*, 1997, 30, pp. 567–573.

Direct Fullerenation of Polycarbonate via Simple Polymer Reactions; Ben Zhong Tang, Shuk Mei Leung, Han Peng, Nai–Teng Yu and Kai C. Su; *Macromolecules*, 1997, 30, pp. 2848–2852.

Synthesis and Optical Properties of Fullerene–Functionalized Polycarbonates; Ben Zhong Tang, Han Peng, Shuk Mei Leung, Cheuk Fai Au, Wan Hong Poon, Huilin Chen, Xuanzheng Wu, Man Wah Fok, Nai–Teng Yu, Hiroyuki Hiraoka, Chunying Song, Jishi Fu, Weikun Ge, George K.L. Wong, Takashi, Monde, Fujito Nemoto, and Kai C. Su.; *Macromolecules*, 1998, 31, pp. 103–108.

Preparation of Ruthenium–Containing Polycarbonate Films and the Chemistry of Ruthenium in Polycarbonate; I1–Wun Shim, Won–Suk Oh, Han–Cheol Jeong, and Won–Kyung Seok; *Macromolecules*, 1996, pp. 1099–1104.

*Primary Examiner*—Terressa M. Boykin
(74) *Attorney, Agent, or Firm*—Noreen C. Johnson; Christian G. Cabou

(57) ABSTRACT

This invention provides a method for preparing polycarbonates, which utilizes polycondensation catalysts which are compounds or complexes of Ruthenium (II) and (III). Preferred catalysts are compounds of the formula $[Ru(aryl)_3]_2^{+2X-}$, where X is a counterion. We have found that this new class of catalysts provides excellent polymerization rates for the preparation of Bisphenol A polycarbonate from the melt polymerization of diphenyl carbonate and Bisphenol A.

42 Claims, No Drawings

MELT POLYCARBONATE CATALYST SYSTEMS

BACKGROUND OF INVENTION

The present invention relates to a method for preparing polycarbonates by a transesterification reaction between, for example, diaryl carbonate and aromatic bis hydroxy compounds. In particular, this invention relates to the melt polymerization reaction for the preparation of polycarbonates and novel polycarbonate catalysts comprised of certain Ruthenium compounds and complexes.

A large number of catalyst systems have been examined for application to the melt polymerization of polycarbonates. Most of these methods require either a variety of co-catalysts or the subsequent addition of a catalyst quencher to ensure polymer stability. The need for high purity, high quality thermoplastic resins requires the reduction of residual contaminants in the final resin. This need for very low residual impurities is particularly acute in optical quality (OQ) grade polycarbonate resins. One approach towards elimination of residual solvent contamination, particularly methylene chloride, is through the implementation of a solventless (i.e., melt) process.

The melt process generally involves a base catalyzed condensation polymerization of, for example, diphenyl carbonate, and a dihydroxy compound such as Bisphenol A. The reaction is conducted at high enough temperatures for the starting monomers and product to remain molten, while the reactor pressure is staged in order to effectively remove phenol, the by-product of the polycondensation reaction.

Most current melt technology programs employ a two component catalyst system. The first component is a tetralkylammonium hydroxide (TMAH) co-catalyst which is used to initiate oligomer formation in the melt. The second catalyst is an alkali metal hydroxide which is the second part of the overall catalyst system. Due to its intrinsic thermal stability, the alkali metal salt must be quenched at the end of the polymerization. This quenching process requires the addition of yet another component to the polymer formation. All materials from the quenching process remain in the final resin, further compromising the final properties.

Although the alkali metal hydroxides in general are excellent melt polymerization catalysts they tend to generate substantial amounts of an additional undesired by-product which is a branched polycarbonate species typically referred to as Fries product which has the repeat unit as set forth below. The formation of Fries product during melt polycarbonate polymerization leads to changes in ductility and in general rheological properties of the polymer. Polycarbonates produced by the melt process typically have higher Fries content than polycarbonates produced by the interfacial method. As used herein the term Fries or fries refers to a repeating unit in polycarbonate having the following formula:

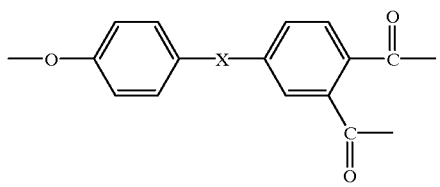

wherein the X variable represents

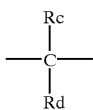

wherein variables $R_c$ and $R_d$ each independently represent a hydrogen atom or a monovalent hydrocarbon group and may form a ring structure.

Thus, a need exists for the development of alternative melt polycarbonate polymerization catalysts which produce less Fries product than conventional catalyst systems.

SUMMARY OF INVENTION

This invention provides a method for preparing polycarbonates, which utilizes polycondensation catalysts which are comprised of certain Ruthenium II and Ruthenium III compounds and complexes. Preferred complexes of the present invention are of the formula $[Ru(aryl)_3]_2^+ 2X^-$, where X is a counterion. We have found that this new class of catalysts provide excellent polymerization rates for the preparation of Bisphenol A polycarbonate from the melt polymerization of diphenyl carbonate and Bisphenol A. Moreover, the catalysts of the invention were found to be very selective in substantially reducing the level of the branching side reaction, i.e., formation of Fries product, normally associated with the melt polycarbonate process, while at the same time producing such polycarbonates at rates and molecular weights which are comparable to conventional NaOH-catalyzed reactions.

DETAILED DESCRIPTION

The present invention provides a method for preparing polycarbonates, which comprises contacting a diaryloxy compound with a compound in the presence of a Ruthenium II or Ruthenium III compound or complex; optionally in the presence of a tetraalkyl ammonium or tetraalkyl phosphonium salt; under melt polycarbonate polymerization conditions.

In a preferred embodiment, the Ruthenium compound is a compound of Formula (I):

$$[Ru(aryl)_3]_2^+ 2X^-, \tag{I}$$

where X is a counterion.

In this embodiment, especially preferred aryl groups include phenyl, napthyl, anthracenyl, phenanthryl, biphenyl and like aryl groups, as well as heteroaryl groups such as thienyl, furyl, pyridyl, pyridazinyl, pyrimidyl, bifuryl, bypyridyl, terpyridyl, diphenyl phenanthryl, optionally substituted by one or more $C_1-C_8$ alkyl, $C_1-C_8$ alkoxy, and halo groups.

Further examples of aryl groups, some of which are listed below, can be found in U.S. Pat. No. 5,112,974, incorporated herein by reference: ethylenediamine, bipyridine, 2,2'-bipyridine, 4,4' diphenyl bipyridine, bis 4,4' methyl bipyridylate, bis 4,4' bipyridylamide, phenanthroline, 1,10-phenanthroline, 4,7-diamino-1,10-phenanthroline, 3,8-diamino-1,10-phenanthroline, 4,7-diethylenediamine-1,10-phenanthroline, 3,8-diethylenediamine-1,10-phenanthroline, 4,7-dihydroxyl-1,10-phenanthroline, 3,8-dihydroxyl-1,10-phenanthroline, 4,7-dinitro-1,10-phenanthroline, 3,8-dinitro-1,10-phenanthroline, 4,7-diphenyl-1,10-phenanthroline, 3,8-diphenyl-1,10- phenanthroline, 4,7-dispermine-1,10-phenanthroline, 3,8-dispermine-1,10-phenanthroline, 5-nitro-phenanthroline, 3,4,7,8-tetramethyl-phenanthroline, diazafluorene-9-one, 4,5-diazafluorene-9-one (flone), phenanthrenequinonediimine, or 9,10-phenanthrenequinonediimine.

Preferred counterions include halo, acetate, carbonate, carboxylate, dicarboxylate, sulfonate, nitrate, alkyl sulfonate, preferably $C^1$–$C_8$ alkyl sulfonate, $BF_4^-$, $PF_6^-$, $AsF_6^-$ and $SbF_6^-$.

Examples of preferred types of compounds of Formula (I) include the following:

[Ru(phenyl)$_3$]$_2^+$2X$^-$, [Ru(phenyl)$_3$]$_2^+$2Cl$^-$, [Ru(phenyl)$_3$]$_2^+$2Br$^-$, [Ru(bipyridyl)$_3$]$_2^+$2X$^-$, [Ru(biphenyl)$_3$]$_2^+$2Cl$^-$, [Ru(bipyridyl)$_3$]$_2^+$2Br$^-$, [Ru(bipyridyl)$_3$]$_2^+$2X$^-$[Ru(bipyridyl)$_3$]$_2^+$2Cl$^-$, [Ru(bipyridyl)$_3$]$_2^+$2 Br$^-$, [Ru(3,3"dihydroxy 2,2"bipyridine]$_3$]$_2^+$2X$^-$, [Ru(3,3"dihydroxy 2,2"bipyridine]$_3$]$_2^+$2Cl$^-$, [Ru(3,3"dihydroxy 2,2"bipyridine]$_3$]$_2^+$2Br$^-$, [Ru(1,10 phenanthroline)$_3$]$_2^+$2X$^-$, [Ru(1,10 phenanthroline)$_3$]$_2^+$2Cl$^-$, [Ru(1,10 phenanthroline)$_3$]$_2^+$2Br$^-$, [Ru(phenanthroline 5,6-diimine)$_3$]$_2^+$2X$^-$, [Ru(phenanthroline 5,6-diimine)$_3$]$_2^+$2Cl$^-$, [Ru(phenanthroline 5,6-diimine)$_3$]$_2^+$2Br$^-$, [Ru(4,4"dicarboxy-2,2"bipyridine)$_3$]$_2^+$2X$^-$, [Ru(4,4"dicarboxy-2,2"bipyridine)$_3$]$_2^+$2Cl$^-$, [Ru(4,4"dicarboxy-2,2"bipyridine)$_3$]$_2^+$2Br$^-$, [Ru(4,4"dimethyl-2,2"bipyridine)$_3$]$_2^+$2X$^-$, [Ru(4,4"dimethyl-2,2"bipyridine)$_3$]$_2^+$2Cl$^-$, [Ru(4,4"dimethyl-2,2"bipyridine)$_3$]$_2^+$2Br$^-$, [Ru(bipyrazyl)$_3$]$_2^+$2X$^-$, [Ru(bipyrazyl)$_3$]$_2^+$2Cl$^-$, and [Ru(bipyrazyl)$_3$]$_2^+$2Br$^-$.

In a further embodiment, the Ruthenium (II) and Ruthenium (III) compounds and complexes are selected from the following: [RuH(1,2 bis(diphenylmethyl benzene)$_2$]$^+$2Cl$^-$; [RuH(1,2 bis(diphenylmethyl benzene)$_2$]$^+$2Br$^-$; Ru(II) porphyrin dimers and tetramers; 2,3,7,8,12,13,17,18-octaethyl-21 H, 23H-porphine ruthenium(II) carbonyl; (CAS Reg. No. 41636-35-5); Pentamethylcyclopentadienylruthenium(III) chloride polymer; (CAS Reg. No. 96503-27-4); Dichloro(1,5-cyclooctadiene)ruthenium(II); (CAS Reg. No. 50982-13-3); Tetrakis(dimethylsulfoxide)dichlororuthenium(II); (CAS Reg. No. 11070-19-2); Potassium hydroxytetranitronitrosoruthenate(II); (CAS Reg. No. 11070-19-2); Ruthenium nitroso hydroxide; Ruthenium(III) iodide; (CAS Reg. No. 13896-65-6); Ruthenium(III) nitrosylnitrate; (Ru(NO)(NO$_3$)$_3$); (CAS Reg. No. 34513-98-9); Pentaaminechlororuthenium(III) dichloride; (CAS Reg. No. 18532-87-1); Dichlorotricarbonylruthenium(II) dimer; (CAS Reg. No. 22594-69-0); Dicarbonyldichlorobis (triphenylphosphine)ruthenium(II); (CAS Reg. No. 14564-35-3); Bis(cyclopentadienyl)ruthenium; (CAS Reg. No. 1287-13-4); Potassium hexacyanoruthenate(II) trihydrate; Tris(2,2,6,6-tetramethyl-3,5-heptanedionato) ruthenium (III); (C$_{33}$H$_{57}$O$_6$Ru); (CAS Reg. No. 38625-54-6); Chloro (indenyl)bis (triphenylphosphine) ruthenium(III); (2C$_{18}$H$_{15}$PC$_9$H$_7$ ClRu); and Ruthenium (III) acetylacetonate.

In the method of the present invention, certain diaryloxy compounds which are useful in preparing the polycarbonates of the invention may be represented by the general formula

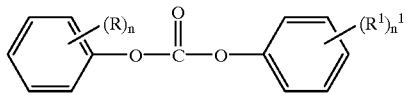

wherein: R is independently selected from halogen, monovalent hydrocarbon, and monovalent hydrocarbonoxy radicals; $R^1$ is independently selected from halogen, monovalent hydrocarbon, and monovalent hydrocarbonoxy radicals; and wherein n and $n^1$ are independently selected from integers having a value of from 0 to 5 inclusive.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, ie., phenyl, naphthyl, and biphenyl. The preferred alkaryl and aralkyl radicals are those containing from 7 to about 14 carbon atoms.

The preferred halogen radicals represented by R and $R^1$ are fluorine, chlorine and bromine.

The divalent hydrocarbon radicals represented by R and $R^1$ include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula $OR^{1'''}$ wherein $R^{1'''}$ is a monovalent hydrocarbon radical of the type described herein. Preferred monovalent hydrocarbonoxy radicals are the alkoxy and aryloxy radicals.

Especially preferred diesters are the diesters of carbonic acid. As the diester of carbonic acid, various compounds may be used, including, but not limited to diaryl carbonate compounds, dialkyl carbonate compounds and alkylaryl carbonate compounds. Preferred diesters of carbonic acid include, but are not limited to, diphenyl carbonate; bis(4-t-butylphenyl)carbonate; bis(2,4-dichlorophenyl) carbonate; bis(2,4,6-trichlorphenyl)carbonate; bis(2-cyanophenyl) carbonate; bis(o-nitrophenyl)carbonate; bis(o-methoxycarbonylphenyl) carbonate; ditolyl carbonate; m-cresol carbonate; cumyl phenyldinaphthyl carbonate; bis (diphenyl) carbonate; diethylcarbonate; dimethyl carbonate; dibutyl carbonate; dicyclohexyl carbonate; and mixtures thereof. If two or more of these compound are utilized, it is preferable that at least one is diphenyl carbonate.

Preferred dihydric phenols include those represented by the formula

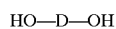

wherein D is a divalent aromatic radical. Preferably, D has the formula:

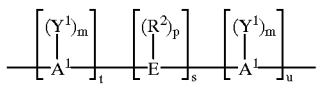

wherein $A^1$ represents an aromatic group such as phenylene, biphenylene, naphthalene and the like; E represents an alkylene or alkylidene group such as methylene, ethylene, ethylidine, propylene, propylidene, isopropylidene, butylene, isobutylene, amylene, isoamylidene, and the like. Where E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage such as sulfide, sulfoxide, sulfone, etc.; or a phosphorus-containing linkage such as phosphinyl, phosphonyl, etc. In addition, E may be a cycloaliphatic group (e.g., cyclopentylidene, cyclohexylidene, 3,3,5-trimethylcyclohexylidene, methylcyclohexylidene, 2-[2,2,1]-bicycloheptylidene, neopentylidene, cyclopentadecylidene, cyclodecylidene, adamantylidene, and the like); a sulfur-containing linkage, such as sulfide, sulfoxide or sulfone; a phosphorus-containing linkage, such as phosphinyl, phosphonyl; an ether linkage; a carbonyl group; a tertiary nitrogen group; or a silicon-containing linkage such as silane or siloxy. $R^2$ represents hydrogen or a monovalent hydrocarbon group such as alkyl, aryl, aralkyl, alkaryl, or cycloalkyl. $Y^1$ may be an inorganic atom such as halogen (fluorine, bromine, chlorine, or iodine); an inorganic group such as nitro; an organic group such as $R^2$ above, or an oxy group such as $OR^2$. It is only necessary that $Y^1$ be inert to and unaffected by reactants and reaction conditions used to prepare the polycarbonate. The letter m represents any integer from and including zero through the number of positions on $A^1$ available for substitution; p represents an integer from and including zero through the number of positions on E available for substitution; t represents an integer equal to at least one; s is either zero or one; and u represents zero or any integer.

In the dihydric phenol compound in which D is represented by the formula above, when more than one Y substituent is present, they may be the same or different. The same holds true for the $R^2$ substituent. Where s is zero in the above formula and u is not zero, the aromatic rings are directly joined with no intervening alkylidene or other bridging group or bond. The positions of the hydroxyl groups and $Y^1$ on the aromatic nuclear residues $A^2$ can be varied in the ortho, meta or para positions and the groupings can be vicinal, asymmetrical or symmetrical relationship, where two or more ring carbon atoms of the hydrocarbon residue are substituted with $Y^1$ and hydroxyl groups.

Further illustrative examples of dihydric phenol compounds include the dihydroxy-substituted aromatic hydrocarbons disclosed in U.S. Pat. No. 4,217,438, incorporated herein by reference.

Further preferred dihydric phenol compounds include the following: 4,4"dihydroxybiphenyl, resorcinol, 4-bromoresorcinol, hydroquinone, 4,4'-dihydroxybiphenyl ether, 4,4-thiodiphenol, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,1-bis(4-hydroxyphenyl)ethane, 1,1-bis(4-hydroxyphenyl)propane, 1,2-bis(4-hydroxyphenyl)ethane, 1,1-bis(4-hydroxyphenyl)-1-phenylethane, 1,1-bis(3-methyl-4-hydroxyphenyl)-1-phenylethane, 2,2-bis(4-hydroxyphenyl)propane ("Bisphenol A"), 2-(4-hydroxyphenyl)-2-)3-hydroxyphenyl)propane, 2,2-bis(4-hydroxyphenyl)butane, 1,1-bis(4-hydroxyphenyl)isobutane, 1,1-bis(4-hydroxyphenyl)decane, 1,1-bis(3,5-dimethyl-4-hydroxyphenyl)cyclohexane, 1,1-bis(3,5-dibromo-4-hydroxyphenyl)cyclohexane, 1,1-bis(4-hydroxyphenyl)cyclohexane, 1,1-bis(4-hydroxyphenyl)cyclododecane, 1,1-bis(3,5-dimethyl-4-hydroxyphenyl)cyclododecane, trans-2,3-bis(4-hydroxyphenyl)-2-butene, 4,4-dihydroxy-3,3-dichlorodiphenyl ether, 4,4-dihydroxy-2,5-dihydroxy diphenyl ethe, 2,2-bis(4-hydroxyphenyl)adamantane, α,α'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl) propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(3,5-dimethyl-4-hydroxyphenyl)propane, 2,2-bis(2,3,5,6-tetramethyl-4-hydroxyphenyl)propane, 2,2-bis(3-5-dichloro-4-hydroxyphenyl)propane, 2,2-bis(3,5-dibromo-4-hydroxyphenyl)propane, 2,2-bis(2,6-dibromo-3,5-dimethyl-4-hydroxyphenyl) propane, α,α-bis(4-hydroxyphenyl)toluene, α,α,α',α'-Tetramethyl-α,α'-bis(4-hydroxyphenyl)-p-xylene, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl) ethylene, 4,4'-dihydroxybenzophenone, 3,3-bis(4-hydroxyphenyl)-2-butanone, 1,6-bis(4-hydroxyphenyl)-1,6-hexanedione ethylene glycol, bis(4-hydroxyphenyl) ether bis(4-hydroxyphenyl)ether, bis(4-hydroxyphenyl)sulfoxide, bis(4-hydroxyphenyl)sulfone, bis(3,5-dimethyl-4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane, ("spirobiindane Bisphenol"), 3,3-bis(4-hydroxyphenyl) phthalide, 2,6-dihydroxydibenzo-p-dioxin 2,6-dihydroxythianthrene, 2,7-dihydroxyphenoxathiin, 2,7-dihydroxy-9,10-dimethylphenazine, 3,6-dihydroxydibenzofuran, 3,6-dihydroxydibenzothiophene, 2,7-dihydroxycarbazole.

A further example of suitable dihydric phenols include those containing spirobiindane structural units such as those represented by the formula:

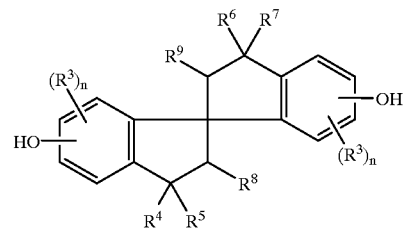

wherein each $R^3$ is independently selected from monovalent hydrocarbon radicals and halogen radicals; each $R^4$, $R^5$, $R^6$, and $R^7$ is independently $C_1$–$C_6$ alkyl; each $R^8$ and $R^9$ is independently H or $C_1$–$C_6$ alkyl; and each n is independently selected from positive integers having a value of from 0 to 3, inclusive. The monovalent hydrocarbon radicals represented by $R^3$ are preferably those containing from 1 to about 12 carbon atoms, and include branched alkyl radicals and straight chain alkyl radicals. Some illustrative, non-limiting examples of these alkyl radicals include methyl, ethyl, propyl, isopropyl, butyl, tertiary-butyl, pentyl, neopentyl, and hexyl. Cycloalkyl radicals represented by $R^3$ are preferably those containing from about 3 to about 12 ring carbon atoms. Some illustrative non-limiting examples of these cycloalkyl radicals include cyclobutyl, cyclopentyl, cyclohexyl, methylcyclohexyl, and cycloheptyl. Aryl radicals represented by $R^3$ are preferably those containing from 6 to 12 ring carbon atoms. Some illustrative non-limiting examples of these aryl radicals include phenyl, biphenyl, and naphthyl. Preferred aralkyl and alkaryl radicals represented by $R^3$ are those containing from 7 to about 14 carbon atoms. These include, but are not limited to benzyl, ethylphenyl, phenylbutyl, phenylpropyl, propylphenyl, and phenylethyl. The preferred halogen radicals represented by $R^3$ are fluorine, chlorine and bromine.

In the dihydric phenols of the above formula, when more than one $R^3$ substituent is present, they may be the same or different. The relative positions of the hydroxyl groups and $R^3$ on the aromatic nuclear residues may be varied in the ortho or meta positions. The position of each hydroxy group is independently at any unsubstituted site on each of the aromatic rings. More preferably, each hydroxy group is independently in positions 5 or 6 and 5' and 6' of each aromatic ring.

The spirobiindane dihydric phenols of the above formula are compounds that are known in the art and are commercially available or may be readily prepared by known methods. Methods of preparation include those described in U.S. Pat. No. 4,701,566; and by R. F. Curtis and K. O. Lewis in Journal of the Chemical Society (England), 1962, p. 420; and by R. F. Curtis in Journal of the Chemical Society (England), 1962, p. 417. In one illustrative, non-limiting example, these spiro dihydric phenols may be conveniently prepared by (i) reacting two moles of a phenolic compound with one mole of a carbonyl-containing compound such as acetone, and (ii) thereafter coreacting 3 moles of the product of (i) under acidic conditions to form the spiro dihydric phenol and 4 moles of a phenolic compound. The acids which may be utilized in (ii) can include acids as anhydrous methanesulfonic acid, anhydrous hydrochloric acid, and the like.

The most preferred spiro dihydric phenol for forming polycarbonates is 6,6'-dihydroxy-3,3,3',3'-tetramethyl-1,1'-spirobiindane (SBI), in which n in the above formula is 0 and the linkages with the rest of the polymer molecule are in a specific position on the aromatic rings.

The dihydric phenols set forth above may be used alone or as mixtures of two or more dihydric phenols. For reasons of availability and particular suitability for many end-uses, a preferred dihydric phenol is 2,2-bis(4-hydroxyphenyl) propane, otherwise known as Bisphenol-A or BPA.

Optionally, polyfunctional compounds may be utilized if the desired product is a branched polycarbonate. Such branched materials may be preferred in certain applications, for example in films for packaging applications. Suitable polyfunctional compounds used in the polymerization of branched polycarbonate include, but are not limited to,1,1, 1-tris(4-hydroxyphenyl)ethane; 4-[4-[1,1-bis (4-hydroxyphenyl)-ethyl]-dimethylbenzyl]; trimellitic anhydride; trimellitic acid, or its acid chloride derivatives; trimethylolpropane; glycerol; and the like.

It was found that catalyst systems comprising compounds and complexes of the present invention provide polymerization rates comparable to alkali metal hydroxides, such as sodium hydroxide, while providing less branched side products. In addition to the catalysts described above, the catalyst system may optionally comprise a quaternary ammonium salt and/or a phosphonium co-catalyst. Examples of suitable quaternary ammonium salts include, but are not limited to ammonium hydroxides having alkyl groups, aryl groups and alkaryl groups; such as tetraamethylammonium hydroxide (TMAH) and tetrabutylammonium hydroxide (TBAH). Suitable phosphonium salts include, but are not limited to tetraethylphosphonium hydroxide and tetrabutylphosphonium hydroxide.

In a preferred embodiment, a substantially equal molar mixture of the diester and the dihydric phenol compound, preferably 1.0 to 1.2, most preferably 1.04–1.14 on a molar basis, is heated at atmospheric pressures in a substantially inert atmosphere at temperatures in the range of from 150° C. to 210° C. Agitation of the mixture can be initiated as soon as the components start to melt. The system can be agitated slowly to promote better heat exchange. After the system has been allowed to thermally equilibrate, an effective amount of the catalyst of the present invention can be added, optionally in the presence of co-catalyst as described above. The co-catalyst serves to catalyze the formation of polycarbonate oligomeric material, which later further undergoes polycondensation to form the polycarbonates of the present invention. In this regard, the catalyst of the present invention may be added at the beginning of the polycondensation reaction, at later stages or during the polymerization step, either in one portion or in multiple portions. An effective amount is at least about $1 \times 10^{-6}$ mol ratio of the catalyst, per mole of BPA, preferably from about $1 \times 10^{-6}$ to $1 \times 10^{-5}$ mol ratio of the catalyst, per BPA. The resulting solution can be stirred until the catalyst has been dispersed and the reaction temperature of the mixture can be raised to 180° C. to 210° C. while the pressure can be lowered to 175 to 250 torr. Distillation of aromatic hydroxy compound (i.e., the polycondensation by-product) can be effected and the pressure continuously reduced to further effect the separation of the aromatic hydroxy compound. The pressure of the reaction can be further reduced to 70 to 130 torr while the temperature can be increased to 220° C. to 250° C. The final stage of the reaction can be initiated by placing the condensation product under full vacuum at 0.1 to 5 torr at a temperature in the range of from 270° C. to 350° C. for 0.5 to 3 hours. Recovery of the final polycarbonate can be achieved after the theoretical amount of aromatic monohydroxy compound has been collected.

The reaction conditions of the melt polymerization are not particularly limited and may be conducted in a wide range of operating conditions. Hence, the term polycarbonate melt polymerization conditions will be understood to mean those conditions necessary to effect reaction between the diaryloxy compound and the dihydric phenol compound. The reaction temperature is typically in the range of about 100 to about 350° C., more preferably about 180 to about 310° C. The pressure may be at atmospheric, or at an added pressure of from atmospheric to about 15 torr in the initial stages of the reaction, and at a reduced pressure at later stages, for example in the range of about 0.2 to about 15 torr. The reaction time is generally about 0.1 hours to about 10 hours.

The melt polymerization may be accomplished in one or more stages, as is known in the art with other catalysts. The catalysts of the present invention may be added in the same stage or different stages, if the melt polymerization is conducted in more than one stage. The optional co-catalyst may be added at any stage, although it is preferred that it be added early in the process. When utilized, the basic co-catalyst is preferably utilized in a 1–500× molar equivalent, based on the moles of catalyst utilized.

In a further preferred embodiment, the process is conducted as a two stage process. In the first stage of this embodiment, the catalyst of the present invention is introduced into the reaction system comprising the dihydric phenol compound and the diaryloxy compound. The first stage is conducted at a temperature of 270° C. or lower, preferably 80 to 250° C., more preferably 100 to 230° C. The duration of the first stage is preferably 0 to 5 hours, even more preferably 0 to 3 hours at a pressure from atmospheric pressure to 100 torr, with a nitrogen atmosphere preferred.

In a second stage, the catalyst is introduced into the product from the first stage and further polycondensation is conducted. The catalyst may be added in its entire amount in the second stage, or it may be added in batches in the second and subsequent stages so that the total amount is within the aforementioned ranges.

It is preferable in the second and subsequent stages of the polycondensation step for the reaction temperature to be raised while the reaction system is reduced in pressure compared to the first stage, thus bringing about a reaction between the dihydric phenol compound and the diaryloxy compound, and for the dihydric phenol and the diaryloxy compound finally to be subjected to a polycondensation reaction at 240 to 320° C. under reduced pressure of 5 mm Hg or less, and preferably 1 mm Hg or less.

If the melt polymerization is conducted in more than one stage, as noted above, it is preferable to add a co-catalyst base, such as tetramethyl ammonium hydroxide in an earlier stage than the catalyst of the present invention. In particular, it is preferable to add the base to the reactor before the temperature reaches 220° C., preferably before it reaches 200° C.

Thus, in a further embodiment, the present invention provides a method for preparing polycarbonates, which comprises the steps of (I) melting a dihydric phenol compound and a diaryloxy compound for a time and period sufficient to form a melt, and introducing a catalyst composition comprising a catalytically effective amount of a Ruthenium (II) or Ruthenium (III) compound or complex; optionally in the presence of a tetraalkyl ammonium or tetraalkyl phosphonium co-catalyst; (II) oligomerizing the product from step (a) in a reaction system comprising at least one continuous reactor in series, wherein said reactor is operated at a temperature of about 210° C. to about 290° C., and wherein the product from the reactor has a number average molecular weight of about 1000 to about 5500; and (III) polymerizing the product from step (b) in a reaction system comprising at least one continuous polymerization reactor in series, wherein said reactor is operated at a temperature of about 280° C. to 315° C., wherein the product from step (c) has a number average molecular weight of at least about 6500.

In a preferred embodiment, the present invention provides a method for preparing polycarbonates, which comprises the steps of (I) melting a dihydric phenol compound and a diaryloxy compound for a time and period sufficient to form a melt, and introducing a catalytically effective amount of at least one catalyst selected from the group consisting of (a) a compound of Formula (I)

[Ru(aryl)$_3$]$_2^+$2X, (I)

wherein X$^-$ is a counterion; (b) [RuH(1,2 bis (diphenylmethyl benzene)$_2$]$^+$2X$^-$; (c) [RuH(1,2 bis (diphenylmethyl benzene)$_2$]$^+$2Br$^-$; or [RuH(1,2 bis (diphenylmethyl benzene)$_2$]$^+$2Cl$^-$; (d) Ru(II) porphyrin dimers and tetramers; (e) 2,3,7,8,12,13,17,18-octaethyl-21H, 23H-porphine ruthenium(II) carbonyl; (f) Pentamethylcyclopentadienylruthenium(III) chloride polymer; (g) Dichloro(1,5-cyclooctadiene) ruthenium(II); (h) Tetrakis(dimethylsulfoxide) dichlororuthenium(II); (i) Potassium hydroxytetranitronitrosoruthenate(II); (k) Ruthenium nitroso hydroxide; (l) Ruthenium(III) iodide; (m) Ruthenium(III) nitrosylnitrate; (n) Pentaaminechlororuthenium(III) dichloride; (o) Dichlorotricarbonylruthenium(II) dimer; (p) Dicarbonyldichlorobis(triphenylphosphine)ruthenium (II); (q) Bis (cyclopentadienyl)ruthenium; (r) Potassium hexacyanoruthenate(II) trihydrate; (s) Tris(2,2,6, 6-tetramethyl-3,5-heptanedionato)ruthenium(III); (t) Chloro(lndenyl)Bis (triphenylphosphine) Ruthenium (III); (2C$_{18}$H$_{15}$PC$_9$H$_7$ClRu); and (u) Ruthenium(III) acetylacetonate; optionally in the presence of a co-catalyst selected from tetraalkyl ammonium and tetraalkyl phosponium salts; (II) oligomerizing the product from step (a) in a reaction system comprising at least one continuous reactor in series, wherein said reactor is operated at a temperature of about 210° C. to about 290° C., and wherein the product from the reactor has a number average molecular weight of about 1000 to about 5500; and (III) polymerizing the product from step (b) in a reaction system comprising at least one continuous polymerization reactor in series, wherein said reactor is operated at a temperature of about 280° C. to 315° C., wherein the product from step (c) has a number average molecular weight of at least about 6500.

Additives may also be added to the polycarbonate product as long as they do not adversely affect the properties of the product. These additives include a wide range of substances that are conventionally added to the polycarbonates for a variety of purposes. Specific examples include heat stabilizers, epoxy compounds, ultraviolet absorbers, mold release agents, colorants, antistatic agents, slipping agents, anti-blocking agents, lubricants, antifogging agents, natural oils, synthetic oils, waxes, organic fillers, flame retardants, inorganic fillers and any other commonly known class of additives.

The reaction can be conducted as a batch or a continuous process. Any desired apparatus can be used for the reaction. The material and the structure of the reactor used in the present invention is not particularly limited as long as the reactor has an ordinary capability of stirring. It is preferable that the reactor is capable of stirring in high viscosity conditions as the viscosity of the reaction system is increased in later stages of the reaction.

While we have shown and described several embodiments in accordance with our invention, it is to be clearly understood that the same are susceptible to numerous changes apparent to one skilled in the art. Other features of the invention will become apparent in the course of the following descriptions of exemplary embodiments which are given for illustration of the invention and are not intended to be limiting thereof.

Example as described herein, the catalysts of the present invention effectively catalyze the melt polymerization reaction in the production of polycarbonates while at the same time reducing the formation of Fries products when compared to conventional NaOH-catalyzed reactions. In the table below, results are compared with an equivalent loading of NaOH. These results indicate a significant improvement in selectivity towards the formation of non-branched polycarbonate while maintaining a comparable reaction rate to NaOH. Comparisons of Fries and molecular weight for [Ru(phen)$_3$]$_2^+$2Cl$^-$ is presented in Table 1.

TABLE 1

Data for [Ru(phen)$_3$]$_2$$^+$ 2 Cl$^+$

| Catalyst | Equivalents* | Mn | Fries |
|---|---|---|---|
| [Ru(phen)$_3$]$_2$$^+$ 2 Cl$^+$ | 5 | 6567 | 172 |
| [Ru(phen)$_3$]$_2$$^+$ 2 Cl$^+$ | 10 | 6353 | 306 |
| NaOH | 5 | 8800 | 3000 |
| NaOH | 8 | 8960 | 5985 |

*One equivalent is 1.0* 10-6 moles catalyst/moleBPA

To facilitate observations and to maintain purity, melt transesterification reactions were carried out in a 1 Liter glass batch reactor equipped with a solid nickel helical agitator. The reactor bottom had a breakaway glass nipple for removal of the final melt. To remove any sodium from the glass the reactor was soaked in 3N HCl for at least 12 hours followed by a soak in 18 Mohm water for at least 12 hours. The reactor was then dried in an oven overnight and stored covered until use. The temperature of the reactor was maintained using a fluidised sand bath with a PID controller and measured near the reactor and sand bath interface. The pressure over the reactor was controlled by a nitrogen bleed into the vacuum pump downstream of the distillate collection flasks and measured at higher pressures (760 mmHg –40 mmHg) with a mercury barometer and at lower pressures (40 mmHg –1mmHg) with an Edwards Pirani gauge.

The reactor was charged with solid Bisphenol-A (General Electric Plastics Japan Ltd., 0.6570 mol) and solid diphenyl carbonate (General Electric Plastics Japan Ltd., 0.7096 mol) prior to assembly. The reactor was then assembled, sealed and the atmosphere was exchanged with nitrogen three times. With the final nitrogen exchange the reactor was brought to near atmospheric pressure and submerged into the fluidized bath which was at 180° C. After five minutes agitation was begun at 250 rpm. After an additional ten minutes the reactants were fully melted and a homogeneous mixture was assumed. Tetramethyl ammonium hydroxide (Sachem stock solution, 1.32×10$^{-4}$ mol) and the catalyst of the invention were added sequentially after being diluted to the proper concentrations, Table 2:

TABLE 2

Reactant Amounts in 18M Ohm water

| Condition | TMAH | Catalyst of invention |
|---|---|---|
| Concentration/M | 0.220 | 1.0–5.0 × 10$^{-3}$ |
| Volume added/ul | 740 | 660 |
| Catalyst/BPA | 2.5 × 10$^{-4}$ | 1.0–5.0 × 10$^{-6}$ |

After the final catalyst was added timing began and the temperature was ramped to 210° C. in five minutes. Once at temperature the pressure was reduced to 180 mmHg and phenol distillate was immediately formed. After 25 minutes the pressure was again reduced to 100 mmHg and maintained for 45 minutes. The temperature was then ramped to 240° C. in five minutes and the pressure was lowered to 15 mmHg. These conditions were maintained for 45 minutes. The temperature was then ramped to 270° C. in five minutes and the pressure was lowered to 2 mmHg. These conditions were maintained for 10 minutes. The temperature was then ramped to the final finishing temperature in five minutes and the pressure was reduced to 1.1 mmHg. The finishing temperature was 310° C. After 30 minutes the reactor was removed from the sand bath and the melt was extruded into liquid nitrogen to quench the reaction.

Fries determination (ppm) was obtained by the liquid chromatographic analysis of the KOH catalysed methanolysis of polycarbonate prepared by melt condensation. Mn (Number average molecular weight) was obtained by GPC analysis of polycarbonate prepared by melt polymerization. Standards of polystyrene were used to construct a universal calibration against which polycarbonate could be measured using the Mark-Houwink equation. The temperature of the columns was 25° C. and the mobile phase was chloroform.

What is claimed is:

1. A method for preparing polycarbonates, which comprises contacting a diaryloxy compound with a dihydric phenol compound in the presence of a Ruthenium (II) or Ruthenium (III) compound or complex; optionally in the presence of a tetraalkyl ammonium or tetraalkyl phosphonium salt; under melt polycarbonate polymerization conditions.

2. A method for preparing polycarbonates which comprises contacting a diaryloxy compound with a dihydric phenol compound in the presence of at least one catalyst selected from the group consisting of (a) a compound of Formula (I)

[Ru(aryl)$_3$]$_2$$^+$2X$^-$,   (I)

wherein X is a counterion;

(b) [RuH(1,2 bis(diphenylmethyl benzene)$_2$]$^+$2X$^-$;

(c) Ru(II) porphyrin dimers and tetramers;

(d) 2,3,7,8,12,13,17,18-octaethyl-21H, 23H-porphine ruthenium(II) carbonyl;

(e) Pentamethylcyclopentadienylruthenium(III) chloride polymer;

(f) Dichloro(1,5-cyclooctadiene) ruthenium(II);

(g) Tetrakis(dimethylsulfoxide)dichlororuthenium(II);

(h) Potassium hydroxytetranitronitrosoruthenate(II);

(i) Ruthenium nitroso hydroxide;

(j) Ruthenium(III) iodide;

(k) Ruthenium(III) nitrosylnitrate;

(l) Pentaaminechlororuthenium(III) dichloride;

(m) Dichlorotricarbonylruthenium(II) dimer;

(n) Dicarbonyldichlorobis(triphenylphosphine)ruthenium (II);

(o) Bis(cyclopentadienyl)ruthenium;

(p) Potassium hexacyanoruthenate(II) trihydrate;

(q) Tris(2,2,6,6-tetramethyl-3,5-heptanedionato) ruthenium(III);

(r) Chloro(lndenyl)Bis(triphenylphosphine) ruthenium (III); (2C$_{18}$H$_{15}$ PC$_9$H7 ClRu); and (s) Ruthenium(III) acetylacetonate;

optionally in the presence of a co-catalyst selected from tetraalkyl ammonium and tetraalkyl phosponium salts;

under melt polycarbonate polymerization conditions.

3. The method of claim 2, wherein the aryl group is selected from the group consisting of phenyl, napthyl, anthracenyl, phenanthryl, biphenyl, thienyl, furyl, pyridyl, pyridazinyl, pyrimidyl, bifuryl, bypyridyl, terpyridyl, and diphenyl phenanthryl; optionally substituted by one or more C$_1$–C$_8$ alkyl, C$_1$–C$_8$alkoxy, and halo groups.

4. The method of claim 2, wherein the compound of Formula (I) is selected from the group consisting of

[Ru(phenyl)₃]₂⁺2X⁻;
[Ru(biphenyl)₃]₂⁺2X⁻; and
[Ru(bipyridyl)₃]₂⁺2X⁻;
wherein X is a counterion.

5. The method of claim 2, wherein the compound of Formula (I) is selected from the group consisting of [Ru(phenyl)₃]₂⁺2Cl⁻; [Ru(phenyl)₃]₂⁺2Br⁻; [Ru(biphenyl)₃]₂⁺2Cl⁻; [Ru(biphenyl)₃]₂⁺2Br⁻; [Ru(bipyridyl)₋]₂⁺2Cl⁻; and [Ru(bipyridyl))₋]₂⁺2Br⁻.

6. The method of claim 2, wherein the catalyst is [RuH(1,2 bis (diphenylmethyl benzene)₂]⁺2Cl⁻.

7. The method of claim 2, wherein the catalyst is [RuH(1,2 bis (diphenylmethyl benzene)₂]⁺2Br⁻.

8. The method of claim 2, wherein the catalyst is selected from Ru(II) porphyrin dimers and tetramers.

9. The method of claim 2, wherein the catalyst is 2,3,7,8,12,13,17,18-octaethyl-21H, 23H-porphine ruthenium(II) carbonyl.

10. The method of claim 2, wherein the catalyst is pentamethylcyclopentadienylruthenium(III) chloride polymer.

11. The method of claim 2, wherein the catalyst is dichloro(1,5-cyclooctadiene) ruthenium(II).

12. The method of claim 2, wherein the catalyst is tetrakis(dimethylsulfoxide)dichlororuthenium(II).

13. The method of claim 2, wherein the catalyst is potassium hydroxytetranitronitrosoruthenate(II).

14. The method of claim 2, wherein the catalyst is ruthenium nitroso hydroxide.

15. The method of claim 2, wherein the catalyst is ruthenium(III) iodide.

16. The method of claim 2, wherein the catalyst is ruthenium(III) nitrosylnitrate.

17. The method of claim 2, wherein the catalyst is pentaaminechlororuthenium(III) dichloride.

18. The method of claim 2, wherein the catalyst is dichlorotricarbonylruthenium(II) dimer.

19. The method of claim 2, wherein the catalyst is dicarbonyldichlorobis (triphenylphosphine)ruthenium(II).

20. The method of claim 2, wherein the catalyst is bis(cyclopentadienyl) ruthenium.

21. The method of claim 2, wherein the catalyst is Potassium hexacyanoruthenate(II) trihydrate.

22. The method of claim 2, wherein the catalyst is Tris(2,2,6,6-tetramethyl-3,5-heptanedionato)ruthenium(III).

23. The method of claim 2, wherein the catalyst is chloro(indenyl)Bbis (triphenylphosphine) ruthenium(III).

24. The method of claim 2, wherein the catalyst is ruthenium(III) acetylacetonate.

25. The method of claim 1, wherein the diaryloxy compound is a compound of the formula

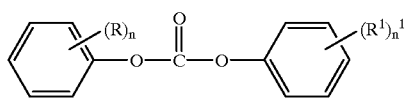

wherein:
R is independently selected from halogen, monovalent hydrocarbon, and monovalent hydrocarbonoxy radicals;
$R^1$ is independently selected from halogen, monovalent hydrocarbon, and monovalent hydrocarbonoxy radicals; and
wherein n and $n^1$ are independently selected from integers having a value of from 0 to 5 inclusive.

26. The method of claim 25, wherein R and $R^1$ are selected from $C_1$–$C_{12}$ alkyl, $C_4$–$C_8$ cycloalkyl, phenyl, napthyl, and biphenyl.

27. The method of claim 25, wherein R and $R^1$ are selected from chlorine and bromine.

28. The method of claim 25, wherein the diaryloxy compound is selected from diaryl carbonate compounds, dialkyl carbonate compounds and alkylaryl carbonate compounds.

29. The method of claim 28, wherein the diaryloxy compound is selected from the group consisting of diphenyl carbonate; bis(4-t-butylphenyl)carbonate; bis(2,4-dichlorophenyl)carbonate; bis(2,4,6-trichlorphenyl)carbonate; bis(2-cyanophenyl)carbonate; bis(o-nitrophenyl)carbonate; bis (o-methoxycarbonylphenyl)carbonate; ditolyl carbonate; m-cresol carbonate; dinaphthyl carbonate; bis(diphenyl)carbonate; diethylcarbonate; dimethyl carbonate; dibutyl carbonate; dicyclohexyl carbonate; and mixtures thereof.

30. The method of claim 1, wherein the dihydric phenol compound is a compound of the formula

HO—D—OH wherein D is a divalent aromatic radical.

31. The method of claim 27, wherein D has the formula:

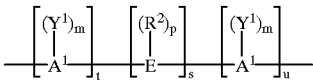

wherein
$A^1$ represents an aromatic group selected from phenylene, biphenylene, and naphthalene; and
E represents an alkylene or alkylidene group selected from methylene, ethylene, ethylidine, propylene, propylidene, isopropylidene, butylene, isobutylene, amylene, and isoamylidene; a cycloaliphatic group selected from cyclopentylidene, cyclohexylidene, 3,3,5-trimethylcyclohexylidene, methylcyclohexylidene, 2-[2,2,1]-bicycloheptylidene, neopentylidene, cyclopentadecylidene, cyclodecylidene, and adamantylidene; a sulfur-containing linkage selected from sulfide, sulfoxide or sulfone; a phosphinyl or phosphonyl group; an ether linkage; a carbonyl group; a tertiary nitrogen group; or a silicon-containing linkage selected from silane or siloxy;
$R^2$ represents hydrogen or a monovalent hydrocarbon group selected from alkyl, aryl, aralkyl, alkaryl, or cycloalkyl; and
$Y^1$ is selected from halogen, nitro; $R^2$ as defined above, or a group of the formula $OR^2$; and
s, t, and u are each independently zero or a positive integer.

32. The method of claim 30, wherein the dihydric phenol is selected from the group consisting of:
4,4'-dihydroxybiphenyl;
resorcinol;
4-bromoresorcinol;
hydroquinone;
4,4'-dihydroxybiphenyl ether;
4,4-thiodiphenol;
1,6-dihydroxynaphthalene;
2,6-dihydroxynaphthalene;

bis(4-hydroxyphenyl)methane;
bis(4-hydroxyphenyl)diphenylmethane;
bis(4-hydroxyphenyl)-1-naphthylmethane;
1,1-bis(4-hydroxyphenyl)ethane;
1,1-bis(4-hydroxyphenyl)propane;
1,2-bis(4-hydroxyphenyl)ethane;
1,1-bis(4-hydroxyphenyl)-1-phenylethane;
1,1-bis(3-methyl-4-hydroxyphenyl)-1-phenylethane;
2,2-bis(4-hydroxyphenyl)propane;
2-(4-hydroxyphenyl)-2-)3-hydroxyphenyl)propane;
2,2-bis(4-hydroxyphenyl)butane;
1,1-bis(4-hydroxyphenyl)isobutene;
1,1-bis(4-hydroxyphenyl)decane;
1,1-bis(3,5-dimethyl-4-hydroxyphenyl)cyclohexane;
1,1-bis(3,5-dibromo-4-hydroxyphenyl)cyclohexane;
1,1-bis(4-hydroxyphenyl)cyclohexane;
1,1-bis(4-hydroxyphenyl)cyclododecane;
1,1-bis(3,5-dimethyl-4-hydroxyphenyl)cyclododecane;
trans-2,3-bis(4-hydroxyphenyl)-2-butene;
4,4-dihydroxy-3,3-dichlorodiphenyl ether;
4,4-dihydroxy-2,5-dihydroxy diphenyl ether;
2,2-bis(4-hydroxyphenyl)adamantine;
α,α'-bis(4-hydroxyphenyl)toluene;
bis(4-hydroxyphenyl)acetonitrile;
2,2-bis(3-methyl-4-hydroxyphenyl)propane;
2,2-bis(3-ethyl-4-hydroxyphenyl)propane;
2,2-bis(3-n-propyl-4-hydroxyphenyl)propane;
2,2-bis(3-isopropyl-4-hydroxyphenyl)propane;
2,2-bis(3-sec-butyl-4-hydroxyphenyl)propane;
2,2-bis(3-t-butyl-4-hydroxyphenyl)propane;
2,2-bis(3-cyclohexyl-4-hydroxyphenyl)propane;
2,2-bis(3-allyl-4-hydroxyphenyl)propane;
2,2-bis(3-methoxy-4-hydroxyphenyl)propane;
2,2-bis(3,5-dimethyl-4-hydroxyphenyl)propane;
2,2-bis(2,3,5,6-tetramethyl-4-hydroxyphenyl)propane;
2,2-bis(3-5-dichloro-4-hydroxyphenyl)propane;
2,2-bis(3,5-dibromo-4-hydroxyphenyl)propane;
2,2-bis(2,6-dibromo-3,5-dimethyl-4-hydroxyphenyl) propane;
α,α-bis(4-hydroxyphenyl)toluene;
α,α,α',α'-Tetramethyl-α,α'-bis(4-hydroxyphenyl)-p-xylene;
2,2-bis(4-hydroxyphenyl)hexafluoropropane;
1,1-dichloro-2,2-bis(4-hydroxyphenyl)ethylene;
1,1-dibromo-2,2-bis(4-hydroxyphenyl)ethylene;
1,1-dichloro-2,2-bis(5-phenoxy-4-hydroxyphenyl) ethylene;
4,4'-dihydroxybenzophenone;
3,3-bis(4-hydroxyphenyl)-2-butanone;
1,6-bis(4-hydroxyphenyl)-1,6-hexanedione;
ethylene glycol bis(4-hydroxyphenyl)ether;
bis(4-hydroxyphenyl)ether;
bis(4-hydroxyphenyl)sulfoxide;
bis(4-hydroxyphenyl)sulfone;
bis(3,5-dimethyl-4-hydroxyphenyl)sulfone
9,9-bis(4-hydroxyphenyl)fluorine;
2,7-dihydroxypyrene;
6,6'-dihydroxy-3,3,3',3'-tetramethylspiro(bis)indane;
3,3-bis(4-hydroxyphenyl)phthalide;
2,6-dihydroxydibenzo-p-dioxin;
2,6-dihydroxythianthrene;
2,7-dihydroxyphenoxathiin;
2,7-dihydroxy-9,10-dimethylphenazine;
3,6-dihydroxydibenzofuran;
3,6-dihydroxydibenzothiophene; and
2,7-dihydroxycarbazole.

33. The method of claim 1, wherein the dihydric phenol is selected from spirobiindane compounds of the formula:

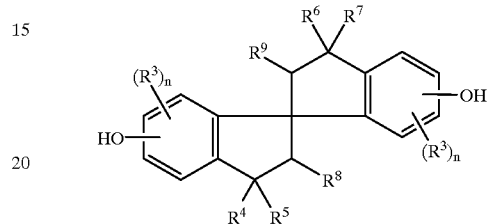

wherein each $R^3$ is independently selected from monovalent hydrocarbon radicals and halogen radicals; each $R^4$, $R^5$, $R^6$, and $R^7$ is independently $C_1$–$C_6$ alkyl; each $R^8$ and $R^9$ is independently H or $C_1$–$C_6$ alkyl; and each n is independently selected from positive integers having a value of from 0 to 3, inclusive.

34. The method of claim 33, wherein the dihydric phenol compound is 6,6'-dihydroxy-3,3,3',3'-tetramethyl-1,1-spirobiindane.

35. The method of claim 1, wherein the diaryloxy compound is diphenyl carbonate and the dihydric phenol compound is 2,2-bis(4-hydroxyphenyl) propane.

36. The method of claim 1, further comprising one or more end capping monomers selected from the group consisting of phenol, p-tert-butylphenol; p-cumylphenol; p-cumylphenolcarbonate; undecanoic acid; lauric acid; stearic acid; phenyl chloroformate; t-butyl phenyl chloroformate; p-cumyl chloroformate; chroman chloroformate; octyl phenyl; and nonyl phenyl chloroformate; or a mixture thereof.

37. A method for preparing polycarbonates, which comprises the steps of
  (I) melting a dihydric phenol and a diaryloxy compound for a time and period sufficient to form a melt, and introducing a catalyst composition comprising a catalytically effective amount of a Ruthenium(II) or Ruthenium(III) compound or complex; optionally in the presence of a tetraalkyl ammonium or tetraalkyl phosphonium co-catalyst;
  (II) oligomerizing the product from step (a) in a reaction system comprising at least one continuous reactor in series, wherein said reactor is operated at a temperature of about 210° C. to about 290° C., and wherein the product from the reactor has a number average molecular weight of about 1000 to about 5500; and
  (III) polymerizing the product from step (b) in a reaction system comprising at least one continuous polymerization reactor in series, wherein said reactor is operated at a temperature of about 280° C. to 315° C., wherein the product from step (c) has a number average molecular weight of at least about 6500.

38. A method for preparing polycarbonates, which comprises the steps of (I) melting a dihydric phenol and a diaryloxy compound for a time and period sufficient to form a melt, and introducing a catalytically effective amount of at least one catalyst selected from the group consisting of
(a) a compound of Formula (I)

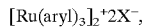

wherein X is a counterion;
(b) [RuH(1,2 bis(diphenylmethyl benzene)$_2$]$^+$2X$^-$;
(c) Ru(II) porphyrin dimers and tetramers;
(d) 2,3,7,8,12,13,17,18-octaethyl-21H, 23H-porphine Ruthenium(II) carbonyl;
(e) pentamethylcyclopentadienylruthenium(III) chloride polymer;
(f) dichloro(1,5-cyclooctadiene) Ruthenium(II);
(g) tetrakis(dimethylsulfoxide)dichlororuthenium(II);
(h) potassium Hydroxytetranitronitrosoruthenate(II);
(i) ruthenium nitroso hydroxide;
(j) ruthenium(III) iodide;
(l) ruthenium(III) nitrosylnitrate;
(m) pentaaminechlororuthenium(III) dichloride;
(n) dichlorotricarbonylruthenium(II) dimer;
(o) dicarbonyidichlorobis(triphenylphosphine)ruthenium (II);
(p) bis(cyclopentadienyl)ruthenium;
(q) potassium hexacyanoruthenate(II) trihydrate;
(r) Tris(2,2,6,6-tetramethyl-3,5-heptanedionato) ruthenium(III);
(s) chloro(indenyl)bis(triphenylphosphine) ruthenium (III); (2C$_{18}$H$_{15}$PC$_9$H$_7$ClRu); and
(t) ruthenium(III) acetylacetonate; optionally in the presence of a co-catalyst selected from tetraalkyl ammonium and tetraalkyl phosponium salts;
(II) oligomerizing the product from step (a) in a reaction system comprising at least one continuous reactor in series, wherein said reactor is operated at a temperature of about 210° C. to about 290° C., and wherein the product from the reactor has a number average molecular weight of about 1000 to about 5500; and
(III) polymerizing the product from step (b) in a reaction system comprising at least one continuous polymerization reactor in series, wherein said reactor is operated at a temperature of about 280° C. to 315° C., wherein the product from step (c) has a number average molecular weight of at least about 6500.

39. The method of claim 38, wherein the diaryloxy compound is selected from the group consisting of diphenyl carbonate; bis(4-t-butylphenyl) carbonate; bis(2,4-dichlorophenyl)carbonate; bis(2,4,6-trichlorphenyl) carbonate; bis(2-cyanophenyl)carbonate; bis(o-nitrophenyl) carbonate; bis (o-methoxycarbonylphenyl) carbonate; ditolyl carbonate; m-cresol carbonate; dinaphthyl carbonate; bis(diphenyl)carbonate; diethylcarbonate; dimethyl carbonate; dibutyl carbonate; dicyclohexyl carbonate; and mixtures thereof.

40. The method of claim 38, wherein the dihydric phenol is selected from the group consisting of:
resorcinol;
4-bromoresorcinol;
hydroquinone;
4,4'-dihydroxybiphenyl ether;
4,4-thiodiphenol;
1,6-dihydroxynaphthalene;
2,6-dihydroxynaphthalene;
bis(4-hydroxyphenyl)methane;
bis(4-hydroxyphenyl)diphenylmethane;
bis(4-hydroxyphenyl)-1-naphthylmethane;
1,1-bis(4-hydroxyphenyl)ethane;
1,1-bis(4-hydroxyphenyl)propane;
1,2-bis(4-hydroxyphenyl)ethane;
1,1-bis(4-hydroxyphenyl)-1-phenylethane;
1,1-bis(3-methyl-4-hydroxyphenyl)-1-phenylethane; 2,2-bis(4-hydroxyphenyl)propane;
2-(4-hydroxyphenyl)-2-)3-hydroxyphenyl)propane;
2,2-bis(4-hydroxyphenyl)butane;
1,1-bis(4-hydroxyphenyl)isobutene;
1,1-bis(4-hydroxyphenyl)decane;
1,1-bis(3,5-dimethyl-4-hydroxyphenyl)cyclohexane;
1,1-bis(3,5-dibromo-4-hydroxyphenyl)cyclohexane;
1,1-bis(4-hydroxyphenyl)cyclohexane;
1,1-bis(4-hydroxyphenyl)cyclododecane;
1,1-bis(3,5-dimethyl-4-hydroxyphenyl)cyclododecane;
trans-2,3-bis(4-hydroxyphenyl)-2-butene;
4,4-dihydroxy-3,3-dichlorodiphenyl ether;
4,4-dihydroxy-2,5-dihydroxy diphenyl ether;
2,2-bis(4-hydroxyphenyl)adamantine;
α,α'-bis(4-hydroxyphenyl)toluene;
bis(4-hydroxyphenyl)acetonitrile;
2,2-bis(3-methyl-4-hydroxyphenyl)propane;
2,2-bis(3-ethyl-4-hydroxyphenyl)propane;
2,2-bis(3-n-propyl-4-hydroxyphenyl)propane;
2,2-bis(3-isopropyl-4-hydroxyphenyl)propane;
2,2-bis(3-sec-butyl-4-hydroxyphenyl)propane;
2,2-bis(3-t-butyl-4-hydroxyphenyl)propane;
2,2-bis(3-cyclohexyl-4-hydroxyphenyl)propane;
2,2-bis(3-allyl-4-hydroxyphenyl)propane;
2,2-bis(3-methoxy-4-hydroxyphenyl)propane;
2,2-bis(3,5-dimethyl-4-hydroxyphenyl)propane;
2,2-bis(2,3,5,6-tetramethyl-4-hydroxyphenyl)propane;
2,2-bis(3-5-dichloro-4-hydroxyphenyl)propane;
2,2-bis(3,5-dibromo-4-hydroxyphenyl)propane;
2,2-bis(2,6-dibromo-3,5-dimethyl-4-hydroxyphenyl) propane;
α,α-bis(4-hydroxyphenyl)toluene;
α,α,α',α'-Tetramethyl-α,α'-bis(4-hydroxyphenyl)-p-xylene;
2,2-bis(4-hydroxyphenyl)hexafluoropropane;
1,1-dichloro-2,2-bis(4-hydroxyphenyl)ethylene;
1,1-dibromo-2,2-bis(4-hydroxyphenyl)ethylene;
1,1-dichloro-2,2-bis(5-phenoxy-4-hydroxyphenyl) ethylene;
4,4'-dihydroxybenzophenone;
3,3-bis(4-hydroxyphenyl)-2-butanone;
1,6-bis(4-hydroxyphenyl)-1,6-hexanedione;
ethylene glycol bis(4-hydroxyphenyl)ether;
bis(4-hydroxyphenyl)ether;
bis(4-hydroxyphenyl)sulfide;
bis(4-hydroxyphenyl)sulfoxide;

bis(4-hydroxyphenyl)sulfone;
bis(3,5-dimethyl-4-hydroxyphenyl)sulfone;
9,9-bis(4-hydroxyphenyl)fluorine;
2,7-dihydroxypyrene;
6,6'-dihydroxy-3,3,3',3'-tetramethylspiro(bis)indane;
3,3-bis(4-hydroxyphenyl)phthalide;
2,6-dihydroxydibenzo-p-dioxin;
2,6-dihydroxythianthrene;
2,7-dihydroxyphenoxathiin;
2,7-dihydroxy-9,10-dimethylphenazine;
3,6-dihydroxydibenzofuran;
3,6-dihydroxydibenzothiophene; and
2,7-dihydroxycarbazole.

41. The method of claim 38, wherein the dihydric phenol compound is 6,6'-dihydroxy-3,3,3',3'-tetramethyl-1,1'-spirobiindane.

42. The method of claim 38, wherein the diaryloxy compound is diphenyl carbonate and the dihydric phenol compound is 2,2-bis(4-hydroxyphenyl) propane.

* * * * *